United States Patent
Oksman et al.

(10) Patent No.: US 7,856,033 B2
(45) Date of Patent: Dec. 21, 2010

(54) METHODS AND SYSTEMS FOR ADAPTIVE COMMUNICATION

(75) Inventors: Vladimir Oksman, Morganville, NJ (US); Axel Clausen, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 701 days.

(21) Appl. No.: 11/598,993

(22) Filed: Nov. 14, 2006

(65) Prior Publication Data

US 2008/0112472 A1    May 15, 2008

(51) Int. Cl.
*H04J 3/16* (2006.01)
*H04B 1/38* (2006.01)

(52) U.S. Cl. ........................ 370/465; 375/222
(58) Field of Classification Search ........................ None
See application file for complete search history.

(56) References Cited

U.S. PATENT DOCUMENTS

| | | | | |
|---|---|---|---|---|
| 6,067,646 | A * | 5/2000 | Starr | 714/701 |
| 6,742,155 | B2 | 5/2004 | Bengough | |
| 6,885,696 | B2 * | 4/2005 | Wingrove | 375/219 |
| 6,971,057 | B1 | 11/2005 | Delvaux et al. | |
| 2001/0050943 | A1 * | 12/2001 | Mahany | 375/130 |
| 2004/0044942 | A1 | 3/2004 | Tzannes | |
| 2005/0138524 | A1 * | 6/2005 | Cioffi | 714/758 |
| 2005/0220202 | A1 | 10/2005 | Tzannes | |
| 2006/0062287 | A1 | 3/2006 | Van Bruyssel | |
| 2006/0153285 | A1 * | 7/2006 | Modlin | 375/222 |
| 2008/0052609 | A1 * | 2/2008 | Peng et al. | 714/799 |
| 2008/0065969 | A1 * | 3/2008 | Jain et al. | 714/784 |
| 2008/0219290 | A1 * | 9/2008 | Cioffi et al. | 370/465 |
| 2008/0232444 | A1 * | 9/2008 | Tzannes | 375/219 |
| 2008/0298444 | A1 * | 12/2008 | Cioffi et al. | 375/222 |

OTHER PUBLICATIONS

ITU-G.993.2, Very High Speed Digital Line Subscribers Transceivers 2, Feb. 2006, p. 52.*
"Specifies of OLR Procedures Which Include Bit Rate Re-Configuration", Vladimir Oksman, ITU—Telecommunication Standardization Sector, Temporary Document ZC-039, Study Group 15, Shenzhen, China, Apr. 24-28, 2006, 8 pgs.
"Proposal on SRA Procedure for VDSL2", Vladimir Oksman, ITU—Telecommunication Standardization sector, Temporary Document ZC-040, Study Group 15, Shenzhen, China, Apr. 24-28, 2006, 6 pgs.
"VDSL2—Dynamic Interleaver Depth Change", ITU—Telecommunication Standardization sector, Temporary Document HA-055, Study Group 15, Huntsville, Alabama, Mar. 21-25, 2005, 9 pgs.
"G.vds12: Interleaver Reconfiguration: Protocol & Activation", Sigurd Schelstraete and Ed Eckert, International Telecommunication Union, Telecommunication Standardization Sector, COM 15-D535-E, Study Group 15—Delayed Contribution 535 Study Period 2005-2008, 3 pgs.
"ADSL2 and ADSL2plus—The New ADSL Standards", DSL Forum, Mar. 25, 2003.

* cited by examiner

*Primary Examiner*—Daniel J Ryman
*Assistant Examiner*—John Blanton
(74) *Attorney, Agent, or Firm*—Eschweiler & Associates, LLC

(57) ABSTRACT

One embodiment relates to a method for transitioning from an initial data rate utilizing an initial transmission variable to a new data rate in a multi-carrier communication system. In the method, a first function or a second function is selected to calculate a modified transmission variable, wherein the first function or second function is selected as a function of relative priorities of first and second communication parameters. The new data rate is implemented by modification of transmission variable. Other methods and systems are also disclosed.

7 Claims, 12 Drawing Sheets

METHODS AND SYSTEMS FOR ADAPTIVE COMMUNICATION

FIELD OF THE INVENTION

The present invention relates generally to communication methods and systems, and more specifically to adaptive communication service in a communication system.

BACKGROUND OF THE INVENTION

In today's business climate, industry fortunes rise and fall on whether information is exchanged in an efficient manner. Cell phones, pagers, and the Internet have thrived because each technology allows businesses to exchange critical market information at a moment's notice. In addition, such technologies allow individuals to keep abreast of recent developments with family and friends. In short, many segments of our modern society require instant access to accurate, up-to-the-minute information.

Digital subscriber line (DSL) technology is one technology that provides users with high-speed data. As networking technology has matured, data rates have increased from 20 kilobits per second (kb/s) in 1975, to 100 Mb/s with modern VDSL. In other words, DSL customers in today's "information age" can receive data approximately 5,000 times as fast as network customers of thirty years ago. To bring customers into this modern "information age", DSL developers have spent billions of dollars to develop the technology as we now know it. To continue to increase data rates at such a remarkable pace, DSL developers will likely be required to spend significant capital resources for many years to come. Thus, DSL technology showcases the premium that our society places on fast and accurate information.

A DSL communication system includes two modems which communicate over an ordinary telephone line (i.e., a twisted pair of copper wires in a conventional residential telephone system). One specific area in which DSL technology is progressing is by trying to limit the number of errors as data is transmitted over the telephone line.

One method of limiting such errors is to selectively reduce the data rate and/or the power of their transmitted signals when communicating modems are not using the full data rate supplied to them. For example, one customer may have a DSL connection that constantly supports bandwidth for simultaneous supply of data to three television sets, even though the customer typically uses only one set at a given time. In early DSL systems, the customer would always receive bandwidth to drive all three television sets simultaneously, even if only one was in use. This would result in "extra" bandwidth being transmitting to the customer, which could lead to undesirable and unjustified cross-talk on the line. Current DSL methods, however, can request a bandwidth that corresponds to the data rate they require. In the illustrative example, the customer's modem would know whether one, two, or three televisions were on, and would request the appropriate data rate to be provided over the DSL line. By employing such methods, modern DSL systems can limit the excess data on the line, thereby reducing the cross-talk on the line while still providing the data rate the customer requires. In other case, the bandwidth of the DSL system can be reduced in the respond on the degradation in the noise environment. When noise conditions are improved back, the DSL system will return to supple high data rate again.

While the existing methods for adjusting data rates are sufficient for their stated purpose, the methods are not sufficient to accurately account for changes in communication parameters during communication service without degrading or interrupting the communication service. Thus, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment relates to a method for transitioning from an initial data rate utilizing an initial transmission variable to a new data rate in a multi-carrier communication system. In the method, a first function or a second function is selected to calculate a modified transmission variable, wherein the first function or second function is selected as a function of relative priorities of first and second communication parameters. The new data rate is implemented by implementing the modified transmission variable.

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1A:
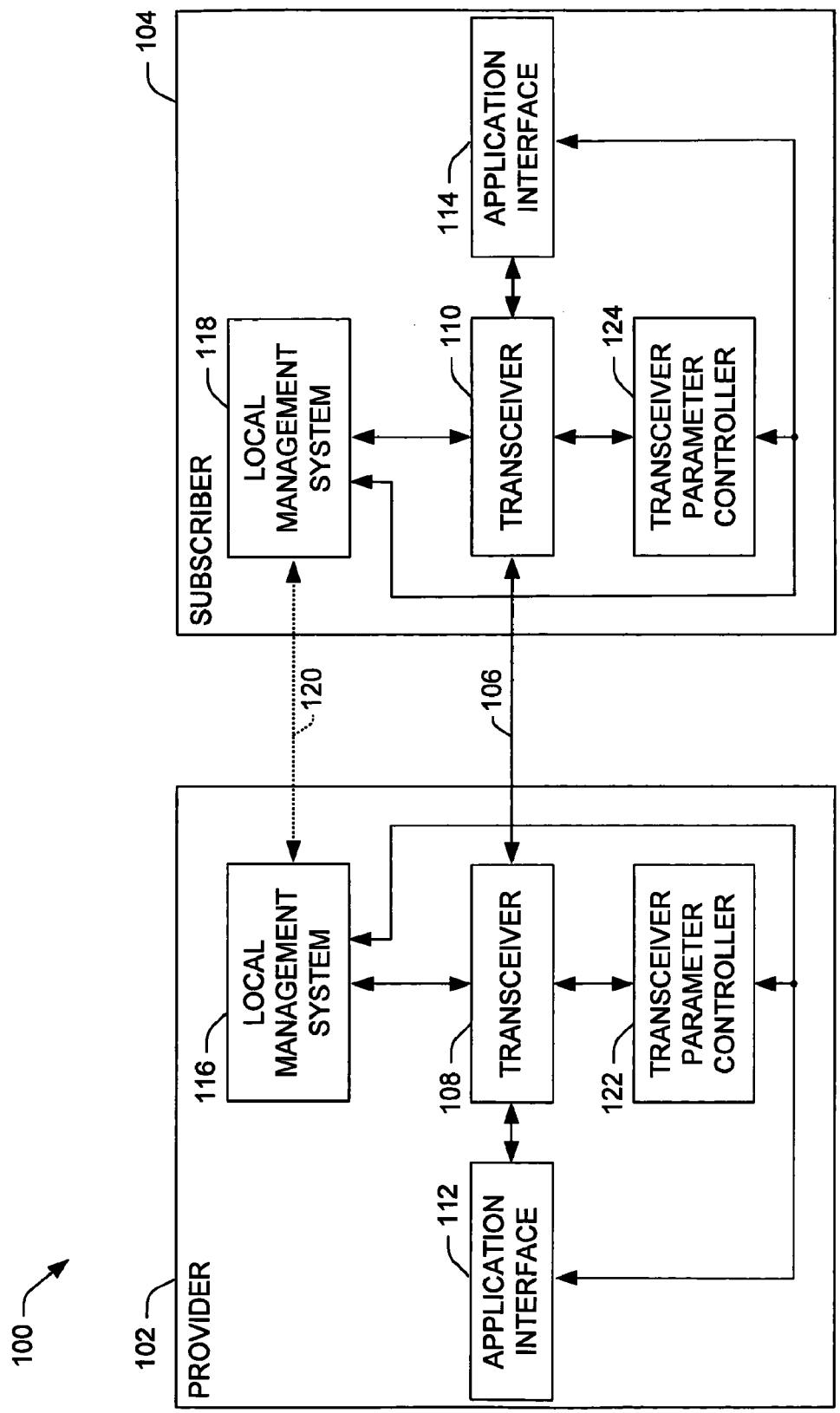
FIG. 1A is a block diagram of one DSL communication system.

The present invention will now be described with reference to the drawings wherein like reference numerals are used to refer to like elements throughout, and wherein the illustrated structures are not necessarily drawn to scale. Although various illustrated embodiments refer to a DSL communication system, the invention finds utility in association with any type of communication system, including but not limited to DSL systems, and single or multi-carrier communication systems. In addition, although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Figure 1B:
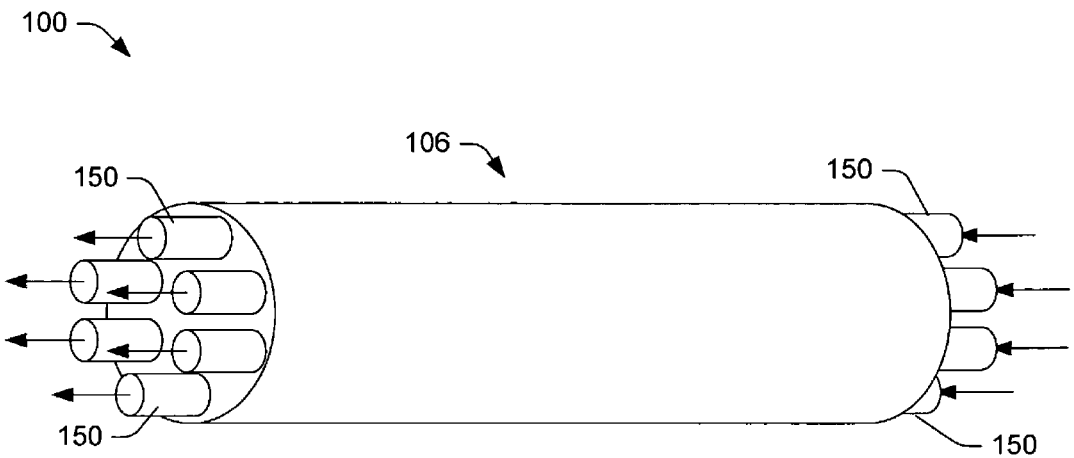
FIGS. 1B-1C illustrate one embodiment of multi-carrier data transmission over a transmission line.
Figure 1C:
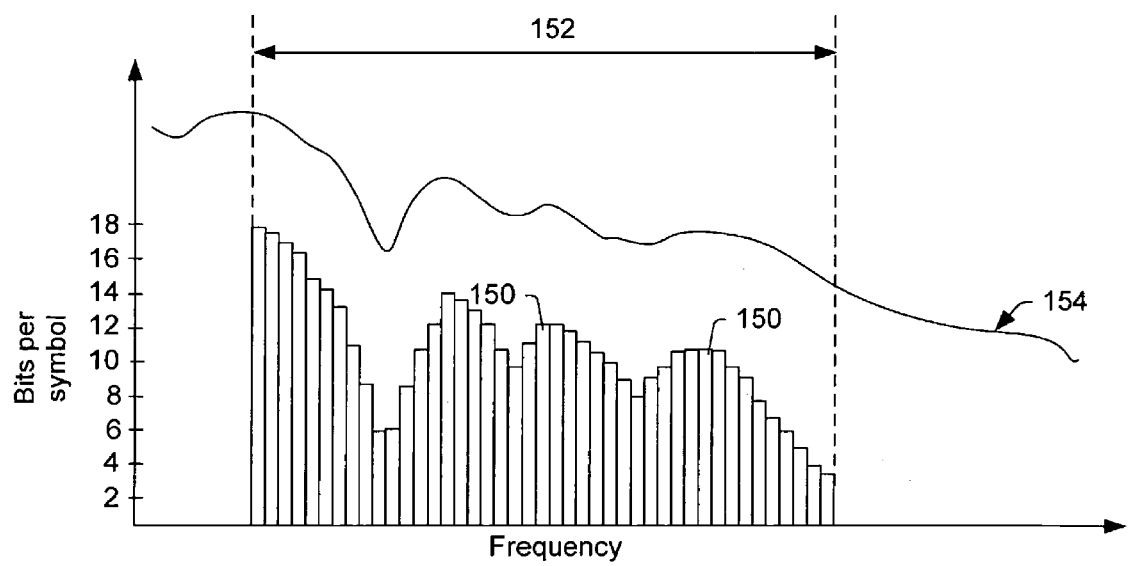

FIGS. 1A-1C illustrate one multi-carrier communication system 100 in which one or more aspects of the invention may be implemented, comprising first and second modems 102 and 104, respectively, coupled to a transmission line 106. One transmission line is a twisted pair of copper wires in a conventional residential telephone system, although the invention may be employed in communications systems using any type of line by which data can be transferred between the modems. In various embodiments, the transmission line may comprise the atmosphere or other medium (e.g., in a wireless communication system). Exemplary modems are DSL modems having suitable circuitry for providing DSL communication service on the line generally in accordance with ANSI T1.413 (ADSL), T1.424 (VDSL), G.993.2 (VDSL2) and other DSL standards, including the performance of the tasks and functions described herein.

In the illustrated communication system 100, the first modem 102 may be a provider modem that is located at a DSL service provider premises. The second modem 104 may be a subscriber modem that is located, for example, in a residential home. Data is transferred in both directions along the line 106, wherein the provider modem 102 transmits data to be received by the subscriber modem 104, and the subscriber modem 104 transmits data to be received by the provider modem 102. In this regard, the exemplary communication system 100 is symmetrical, although the various aspects of the invention may be carried out in other systems in which data is transferred in only a single direction.

In order to appreciate the various aspects of the invention, the illustrated system and the various methods of the invention are hereinafter described with respect to data being transferred in a first direction from the provider modem 102 to the subscriber modem 104. Accordingly, in the following discussion, the first modem 102 (specifically, a transceiver 108 thereof may be referred to as a "transmitter" and the second modem 104 (specifically, a transceiver 110 thereof may be referred to as a "receiver" for purposes of describing the various aspects of the invention. However, it will be appreciated that both modems 102 and 104 are capable of transmitting and receiving data in the illustrated implementation.

The exemplary first modem 102 comprises a transceiver 108 that is coupleable to the line 106 and operates to support communication (e.g., DSL) service with the second modem 104, specifically a transceiver 110 thereof. The first modem 102 also comprises an application interface 112 to a host system, such as a service subscriber's home computer (not shown), wherein the second modem 104 also comprises an application interface 114 with a network node (not shown).

Each modem 102 and 104 also includes a local management system (116 and 118, respectively), which provides transmission variables and control signals to facilitate communication between the modems 102 and 104. For example, each local management system can provide sub-carrier bit allocations, gain settings, forward-error-correction (FEC) parameters, interleaver (IL) parameters, and modulation parameters for communicating data to and from the line. The local management systems 116 and 118 of the first and second modems 102 and 104, respectively, exchange transmission variables related to FEC, IL, modulation, and other elements of the modem, to provide matching settings of parameters in both modems (e.g., like FEC parameters of FEC encoder will match the FEC parameters of the FEC decoder, and so on). Control information and transmission variables are exchanged between the two modems via a management channel 120, arranged over one or more of the sub-carriers of the line 106, or as an embedded overhead data channel, using any suitable communication or data exchange protocol, so as to coordinate parameters settings, rate adjustments, timing of changes, etc.

Further, each modem 102 and 104 includes a transceiver parameter controller 122 and 124, respectively, that work in conjunction with the local management system 116, 118 to communicate transceiver parameters, which may also be referred to as transmission variables, over the management communication channel 120. Each transceiver parameter controller 122, 124 is configured to adaptively alter a transceiver parameter to perform an on-line reconfiguration of the data-rate (e.g., increase or decrease the bit rate) without interrupting the communication service. Further, the transceiver parameter controllers 122, 124 can adjust the bit rate while keeping the other communication parameters (e.g., delay, impulse noise protection, bit error rate, management communication channels, and performance monitoring) under the required limits (usually with minimum changes).

In one embodiment, the modems 102 and 104 can transmit data over the transmission line 106 by using discrete multi-tone (DMT) or any other technology that uses multiple frequencies. As shown in FIGS. 1B-1C, in one DMT embodiment, a transmission line 106 can carry data over a number of sub-carriers 150 that span the frequency range 152 assigned to DSL, wherein each subcarrier 150 comprises a narrow frequency band within the frequency range 152. For example, in one DSL implementation, 247 separate sub-carriers, each 4 KHz wide will span the DSL frequency range. Thus, one could think of one type of DSL technology as the phone company or service provider dividing the frequency range in a transmission line 106 (e.g., phone line) into numerous individual 4-KHz bands (or sub-carriers 150), and then transmitting data over each sub-carrier 150. Thus, by using a modem, a customer in the prior mentioned DSL implementation could receive data over 247 sub-carriers of one phone line, and thereby receive high-speed data.

In various embodiments, the communicating modems monitor the signal-to-noise-ratio (SNR) 154 over the frequency range 152 (e.g., SNR associated with each sub-carrier 150), and if the noise on one sub-carrier becomes too high, then the communicating modems switch to transfer data on another sub-carrier. Thus, various DSL systems can continually switch data from one sub-carrier to another to provide users a high data rate that has relatively few data errors. Although monitoring the sub-carriers and encoding and decoding messages on each sub-carrier makes such communication computationally complex, it gives the modems the ability to provide users with high speed data connections with relatively few errors.

In addition to transmitting data based on the relative SNR associated with each sub-carrier (e.g., DMT), the modems may utilize various data processing measures to reduce the adverse affects of noise in the communication system. Referring now to FIG. 2A-2H, one embodiment of such data processing in a DSL system 100 is now discussed. In FIGS. 2A-2H, data is shown as being transmitted from a provider modem 102 to a subscriber modem 104, wherein the subscriber modem 104 receives the data, and wherein both modems 102 and 104 utilize agreed on transmission variables and communication parameters during communication. In various embodiments, the communication parameters can include system variables including, but not limited to: data rate, bit error rate, delay, impulse noise protection, and the like. In these and other embodiments, transmission variables can relate to transceiver parameters, including, but not limited to: interleaver depth, bit loading parameters, and FEC parameters, and the like. For purposes of simplicity, data is shown as being transmitted only from the provider modem 102 to the subscriber modem 104, although it will be appreciated that in typical implementations both modems 102 and 104 are capable of transmitting and receiving data in the manner described.

Figure 2A:
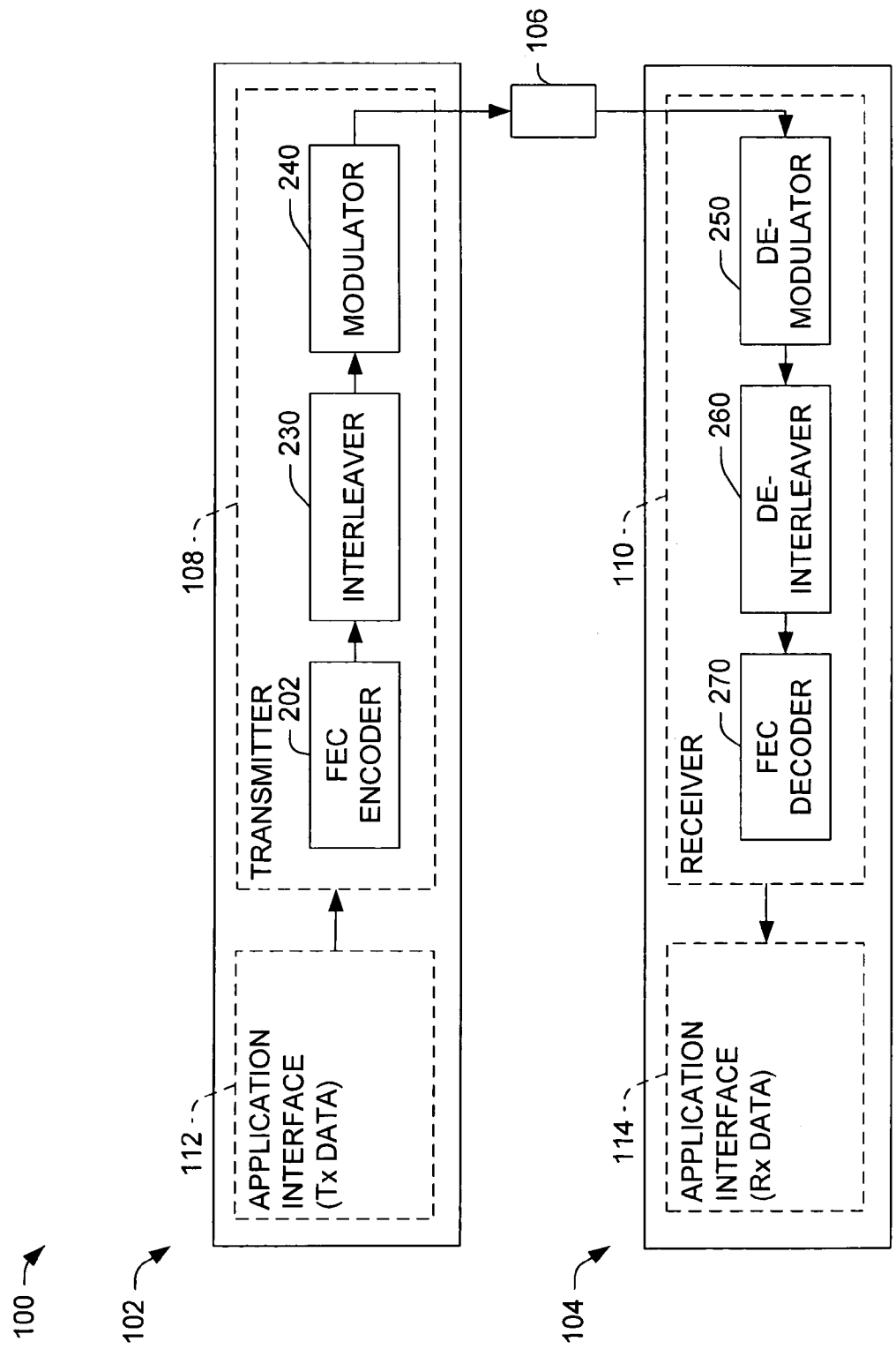
FIGS. 2A-2H illustrate one embodiment of data processing in a DSL communication system.
Figure 2B:
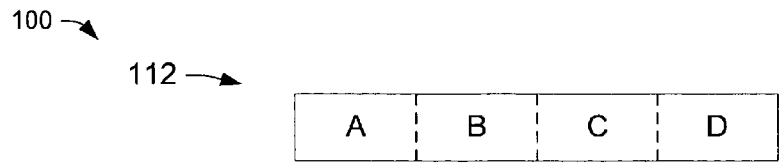

As shown in FIG. 2A, application data is provided at the application interface 112 of the first modem 102 as a number of blocks of data (e.g., message "ABCD" in FIG. 2B) from which it will traverse various layers of the network stack.

Figure 2C:
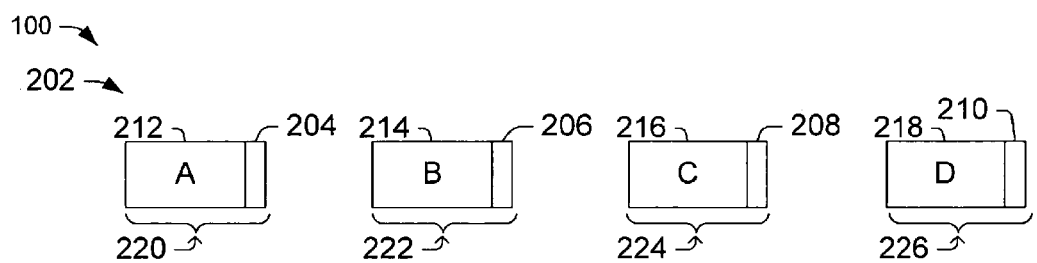

A Forward Error Correction (FEC) encoder 202 generates a certain number of redundancy bytes for each block of data. As shown in FIG. 2C, the FEC encoder adds redundancy bytes (204, 206, 208, 210) to each block of data (212, 214, 216, 218, respectively) to form an FEC codeword (220, 222, 224, 226, respectively). Typical DSL modems will support Reed-Solomon forward error correction, and may support others in addition to or in substitution thereof.

Figure 2D:
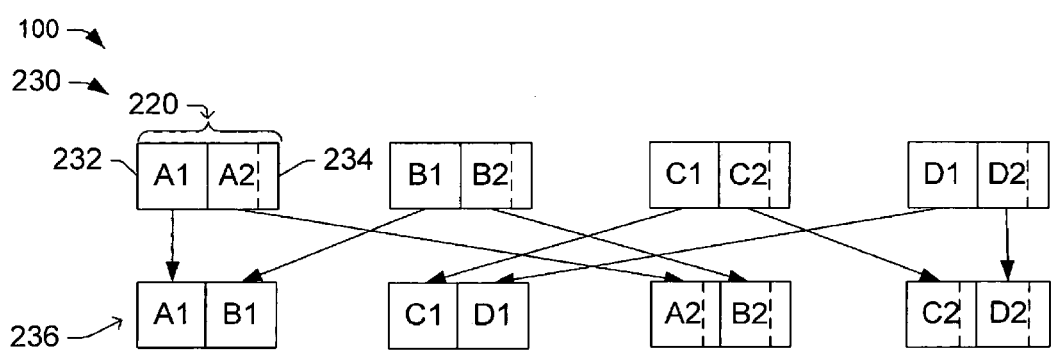
Figure 2E:
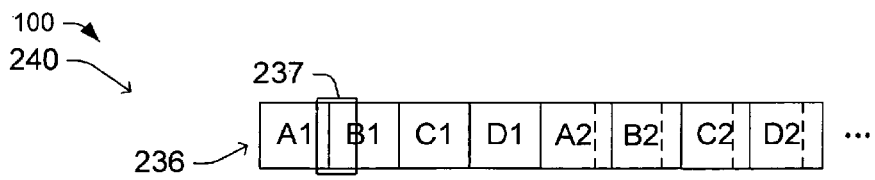

After the addition of redundancy bytes, an interleaver 230 mixes the FEC codewords in a manner so as to limit the effects of impulse noise corruption. In order to allow the interleaver 230 to mix the FEC codewords, the interleaver includes buffer memory, which introduces latency into the system. The buffer memory usually determines "interleaver depth," wherein higher depth usually provides higher impulse noise protection. As FIG. 2D shows, the interleaver 230 divides each codeword (e.g., 220) into smaller segments (e.g., 232 and 234), which each typically includes one or more bytes, and then mixes (interleaves) the segments from different codewords in accordance with a predetermined algorithm to form an interleaved data stream 236. The algorithm for segment mixing is intended to place segments belonging to the same FEC codeword (e.g., 232, 234) remotely from each other in the interleaved data stream 236. Thus, during transmission, adjacent segments of one FEC codeword (e.g., 232, 234) are separated by a time period that is associated with the interleaver depth, while all segments of one FEC codeword are spread over a time period associated with the latency introduced by the interleaver (also referred to as interleaver delay). Because impulse noise during any given short period of time results in corruption of only one or a few segments belonging to a particular FEC codeword, as the interleaver delay is increased, the DSL system can withstand longer erasure (e.g., impulse noise bursts), causing fewer errors in each reassembled (e.g., de-interleaved) codeword at the receive side. Although FIG. 2D shows one straightforward algorithm with which segments could be mixed, the present invention includes countless others. For example, typical DSL modems will support convolutional interleaving, although they may support others in addition to or in substitution thereof.

After the interleaver 230 processes the data, the interleaved data stream 236 is divided into so-called data frames 237, wherein each data frame contains a number of bits of interleaved data that could be loaded onto a symbol, for example, via a one-to-one mapping, wherein each symbol is an N-dimensional (possibly complex) vector. The modulator 240 modulates the symbols onto the sub-carriers (e.g., 150 in FIG. 1C) assigned for the transmission. Typically, the modulator 240 performs the initial encoding using bit distribution parameters (e.g., bit loading parameters, framing parameters) agreed by modems at two sides of the line during a handshake or initialization stage of communication. After encoding the data stream, the modulator 240 then modulates the outgoing sub-carrier constellations (in the presented example using inverse discrete Fourier transform (IDFT)) onto the sub-carriers 150 according to the set bit distribution, and provides the modulated (analog) signals to the line 106 according to sub-carrier power settings. The process by which data is loaded onto the sub-carriers may also be referred to as bit loading.

After the modulated signals traverse the line 106, the modulated signals are received at the second modem 104, specifically the demodulator 250 thereof, which includes suitable analog circuits for interfacing with the line 106. The demodulator 250 of the second modem 104 demodulates the received signals into individual sub-carrier constellations (e.g., by discrete Fourier transform or "DFT" techniques in the presented example), and decodes the received constellations according to the bit distribution parameters (e.g., bit loading parameters, framing parameters) agreed upon during the initialization.

Figure 2F:
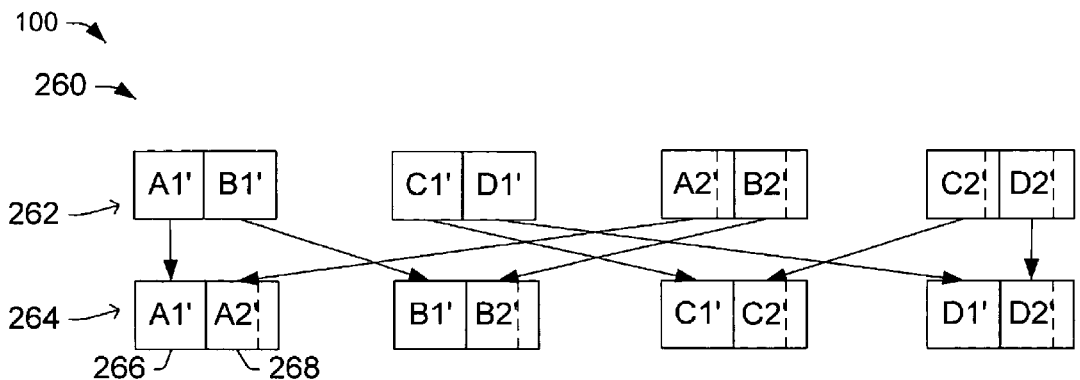

After the demodulator 250 receives the transmitted data, the deinterleaver 260 un-mixes (de-interleaves) the received data stream. As shown in FIG. 2F, the received data stream 262 is deinterleaved to retrieve a stream of received segments 264, which includes one or more segments (e.g., 266, 268). The deinterleaver 260 includes buffer memory, wherein the buffer memory may introduce latency into the system. Depending on whether noise alters the data transmitted on the line, the data of the received segments (e.g., A1', A2', B1', B2', ...) may or may not be equal to the data of the transmitted segments (e.g., A1, A2, B1, B2, ... respectively). Although FIG. 2F shows one straightforward algorithm with which the received data stream could be de-interleaved to retrieve the received segments 232, the invention includes countless others (e.g., inverted interleaver algorithms) and such variations are contemplated as falling within the scope of the invention.

Figure 2G:
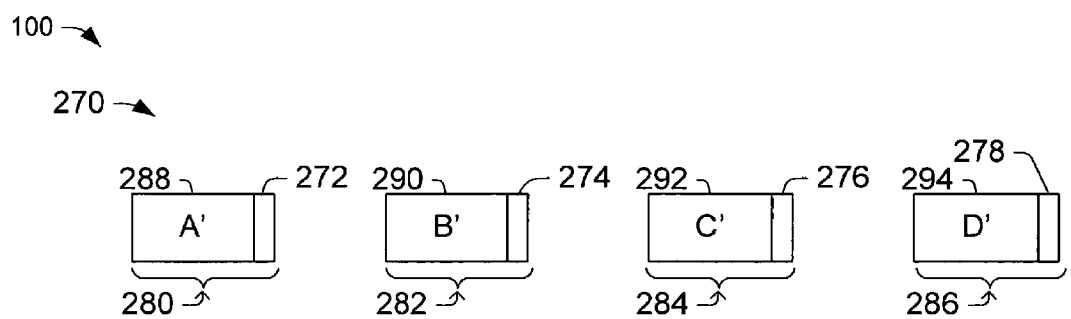

After the deinterleaver 260 reassembles the data as shown in FIG. 2G, the FEC decoder 270 uses the redundancy bytes (272, 274, 276, 278) of each received FEC codeword (280, 282, 284, 286, respectively) for recovering or correcting a certain number of corrupted data bytes from each corresponding block of data (288, 290, 292, 294, respectively). Thus, the FEC decoder 270 ensures that when a small number of bytes in a received codeword are corrupted, the original data transmitted in the codeword (e.g., A, B, C, D) can be recovered from the data in the received codeword (e.g., A', B', C', D'). Thus, increasing FEC redundancy (e.g., the number of redundancy bits) adds further FEC protection against impulse noise while effectively decreasing the data rate, and vice versa, wherein the goals of impulse noise protection and effective data rate involve a tradeoff.

Figure 2H:
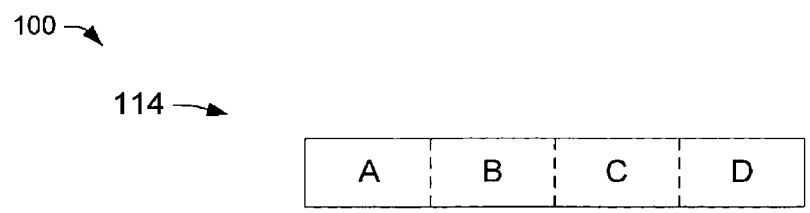

After the FEC codewords are processed by FEC decoder 270, the resulting data can be reassembled at the application interface 114 (e.g., message "ABCD") as shown in FIG. 2H. This resulting data can, for example, be utilized for a user's benefit.

Thus, FEC redundancy allows correction of a certain amount of corrupted bytes/bits in each codeword. Further, interleaving helps reduce the amount of corrupted bytes in each individual codeword. By utilizing FEC redundancy and interleaving, DSL systems may effectively combat a given amount of impulse noise in the line which is usually associated with impulse noise protection. Also, as discussed above, increasing FEC capabilities requires more redundancy bytes to be introduced, and reduces the effective data rate. Thus, there is a tradeoff between impulse noise protection and effective data rate in DSL systems.

Although the communication system 100 and several of its components has been described above, it will be appreciated that the present invention includes countless other variations that are contemplated as falling within the scope of the invention. For example, to further facilitate accurate data transmission, the communication system could also include a scrambler (e.g., positioned between the application interface 112 and the FEC encoder 202) and descrambler (e.g., positioned between the FEC decoder 270 and the application interface 114).

The various components of the communication system and other systems of the invention include suitable circuitry, state machines, firmware, software, logic, etc. to perform the various methods and functions illustrated and described herein, including but not limited to the exemplary methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 100 in FIG. 1) as well as in association with other systems not illustrated, wherein all such implementations are contemplated as falling within the scope of the present invention and the appended claims.

Seamless Rate Adaptation (SRA) and Dynamic Rate repartitioning (DRR) are methods that facilitate selectively adjusting the bit rate at which data is transmitted between two modems without interrupting the communication service. Known SRA and DRR procedures are defined in International Telecommunication Union (ITU-T) standards ITU-G992.3, ITU-T G.993.3, and ITU-G992.5. For example, if a customer is receiving "extra" bandwidth, SRA can be used to reduce the bit loading on some sub-carriers or by reducing the number of sub-carriers used, thereby reducing the effective data rate. Conversely, if a customer needs additional bandwidth during communication, SRA can be used to increase the effective data rate by increasing bit loading. As the bit loading is changed, both the latency and impulse noise protection of the system change. Regarding DRR, a DSL system can use a number of latency paths and can then dynamically allocate data rate between those latency paths. For example, a first and second television could be associated with a first latency path, while a second latency path could be used for Internet browsing and voice services. If the first television set is switched off, the bit rate associated with the first television set could be switched to the second latency path to improve Internet browsing. Thus, although the data rate with respect to the individual latency paths changes, the total data rate over the line remains unchanged.

Figure 3:
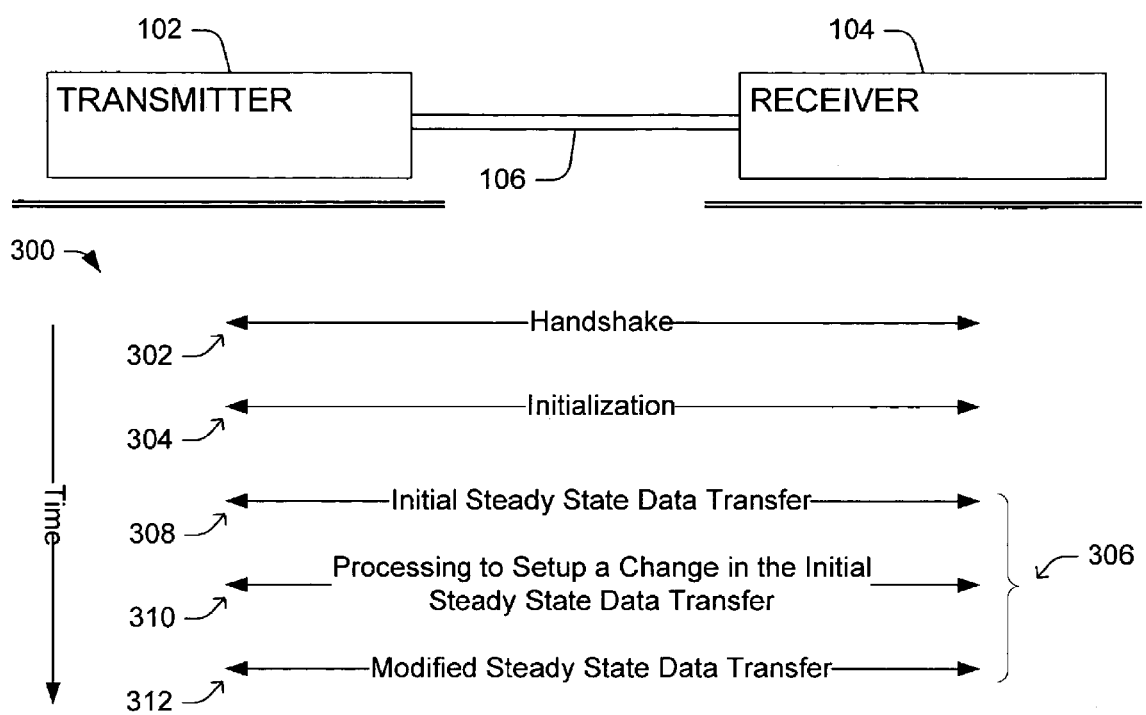
FIG. 3 is one embodiment of a communication protocol for a DSL system.

FIG. 3 shows one communication protocol 300 for providing communication service that can include an SRA or DRR procedure, wherein horizontal lines can indicate stages of communication or messages exchanged between the modems. In this protocol, the communicating modems can adjust the number of bits loaded onto each sub-carrier and/or the power at which subcarriers are transmitted, and the number of subcarriers used for the particular latency path without interrupting the communication service. The illustrated communication protocol 300 includes several steps, which are further described below, namely: handshake 302, initialization 304, and data transfer 306.

In step 302, the modems can undergo a handshake session, which is somewhat analogous to two people shaking hands and introducing themselves when they first meet. The handshake session serves to identify the type of modems in communication, and to negotiate and agree on a common set of initial transmission variables (e.g., FEC and IL parameters) for the communication service, wherein handshake messages are sent from one modem to the other to facilitate the negotiation and agreement of the common set of transmission variables. In one embodiment, the handshake session may be carried out in accordance with ITU-standard G.994.1.

After the handshake session, the modems can continue on to an initialization session in step 304. In general, the initialization session includes a message exchange and the capture of channel parameters (e.g., channel estimation, signal-to-noise ratio estimation, calculation of coefficients of the equalizer and echo canceller, determination of bit loading on sub-carriers). In a typical situation, the signal-to-noise ratio (SNR) for each sub-carrier is measured during system initialization, and the maximum bit capacity of each sub-carrier is determined. To assess higher transmission capability, the modems can assign more bits (e.g., larger constellation sizes) onto sub-carriers with higher SNR compared to sub-carriers having lower SNR and adjust the sub-carrier relative transmit powers (e.g., gains). Illustrative initialization sessions are described in ITU-T recommendation G.992.1 (ADSL) or ITU recommendation G.993.2 (VDSL2).

After the initialization session 304, the modems can transfer data in step 306 (which may also be referred to as "showtime"), wherein during such transfer the modems utilize transmission variables (e.g., bit loading, gains, FEC parameters and interleaving parameters as previously discussed). In embodiments requiring a change in data transfer without interrupting the communication service, data transfer 306 may include the substeps of: initial steady state data transfer 308, processing to setup a change in the initial steady state data transfer 310, and modified steady state data transfer 312. If a change in data transfer is required, one of several methods could be utilized in such a process, including but not limited to: SRA and DRR.

Figure 4:
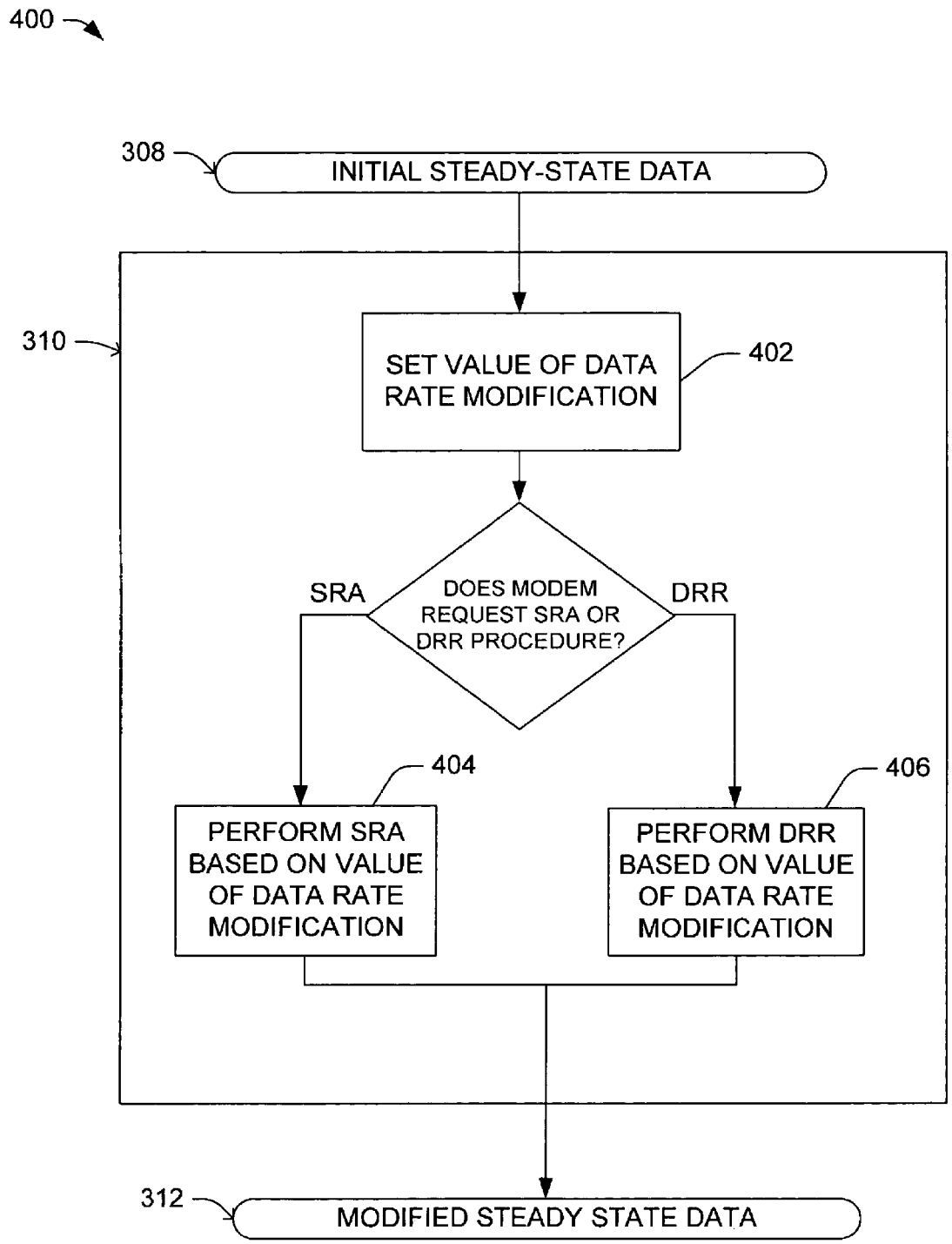
FIG. 4 is one embodiment for setting a value of a bit rate and selecting a an SRA or DRR communication protocol in a DSL system.

One method 400 in which processing to setup a change in the initial steady state data transfer (310) is used is shown in FIG. 4, wherein the communicating modems provide a modification of the total bit rate by implementing an SRA or modification of bit rate for particular latency path implementing a DRR procedure. In this method 400, the modems can concurrently implement a new data rate, wherein bit loading and other transmission variables (e.g., interleaver depth or framing) are selectively altered while communication parameters (e.g., impulse noise protection and delay) are held under the limits of the system requirements, which in practice means approximately constant. At 402, a value is set for the data rate modification. Then the modems can carry out an SRA procedure at 404 or a DRR procedure at 406, depending on which procedure the modems negotiate during communication service.

In one embodiment, the communicating modems can calculate the value of the data rate modification by utilizing a priority scheme to determine transmission variables (e.g., bit loading parameters). In one embodiment, this priority scheme relates to first and second communication parameters that relate to various data transmission characteristics, such as an impulse noise protection or delay.

In one embodiment where the modems are configured to keep the latency and impulse noise protection constant before and after the data rate modification, each modem changes the depth of its interleaver/deinterleaver (e.g., 230, 260 in FIG. 2A) proportionally to the change in data rate. This proportional change in interleaver depth is used because as modems change the data rate, the FEC encoder 202, FEC decoder 270, interleaver 230, and de-interleaver 260 can cause a change in the delay on the path. This change in the delay may be proportional to the change in the bit rate (e.g., if the bit rate increases by factor of k, the delay decreases by factor of k). To keep the delay and the impulse noise protection constant before and after the change of the bit rate, the interleaving depth can be changed proportionally to the change of the bit rate. However, because typical interleaver depths can only be set to integers that are co-prime with the value of I=$N_{FEC}$/q (not any integer value), where $N_{FEC}$ and q are FEC codeword parameters, special measures may be taken to properly adjust the interleaver depth in conjunction with the bit loading.

Figure 5:
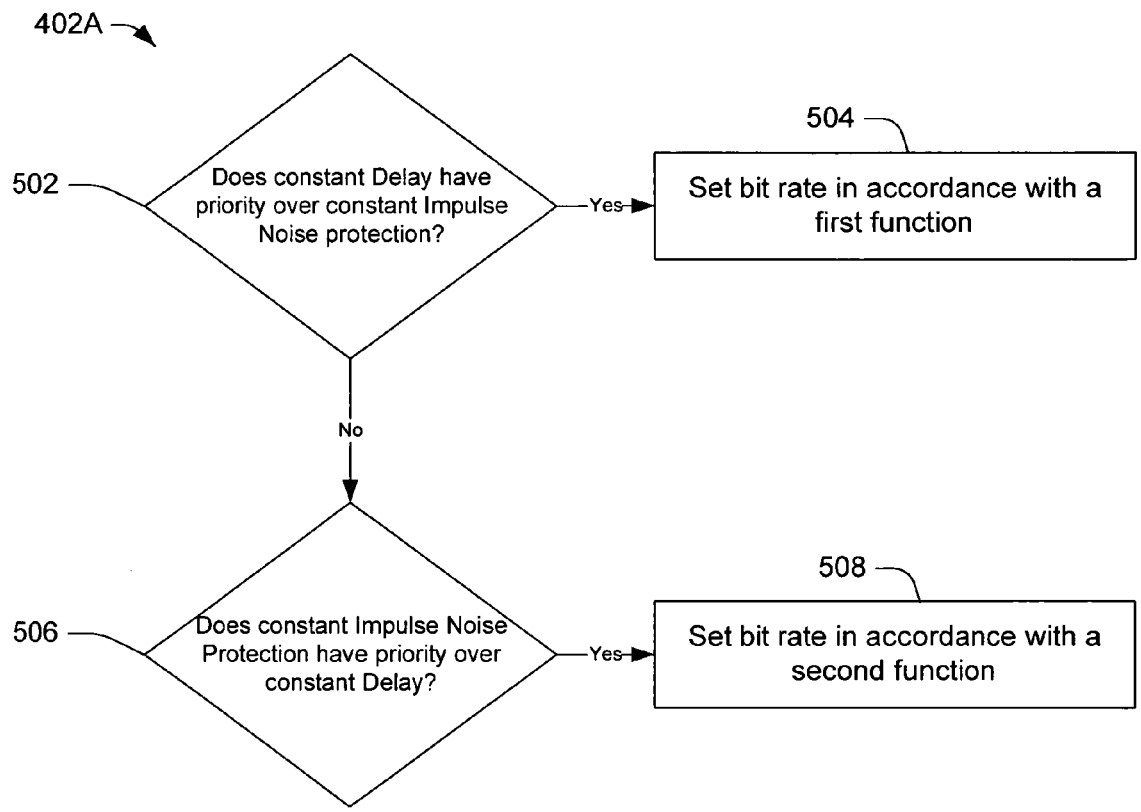
FIG. 5 is one embodiment for setting a value of a bit rate.

FIG. 5 shows one embodiment for setting the value of the data rate modification 402A. If constant delay has priority over constant impulse noise protection (YES at 502), then the bit rate parameters are assigned according to a first function in step 504. For example, in FIG. 5's illustrated embodiment, the first function could be represented by equation (1):

$$Lp' = \text{floor}\left[Lp \times \frac{Dp'-1}{Dp-1}\right] \quad (1)$$

where $L_p'$ is the new value of bit loading parameter on latency path #p, $L_p$ is the initial value of bit loading parameter on latency path #p, $D_p'$ is the new value of interleaver depth on latency path #p, and $D_p$ is the initial value of interleaver depth on the latency path #p. Conversely, if constant impulse noise protection has priority over constant delay (YES at 506), then the modem assigns the bit rate parameters according to a second function that is different from the first function in step 508. For example, the second function could be that of equation (2):

$$Lp' = \text{floor}\left[Lp \times \frac{Dp'}{Dp}\right] \quad (2)$$

where $L_p'$ is the new value of bit loading on latency path #p, $L_p$ is the initial value of bit loading on latency path #p, $D_p'$ is the new value of interleaver depth on latency path #p and $D_p$ is the initial value of interleaver depth on latency path #p. It will be appreciated that equations (1) and (2) are merely examples of functions that could be utilized, and other functions are also contemplated as falling within the scope of the present invention.

Thus, in one embodiment, when the modem selects the value of the bit rate, the modem can take into account the values of the depth of the interleaver and the bit loading. The specific selection can be made using service priorities (e.g., whether it is more important to limit variations in latency or impulse noise protection in the system.)

Figure 6:
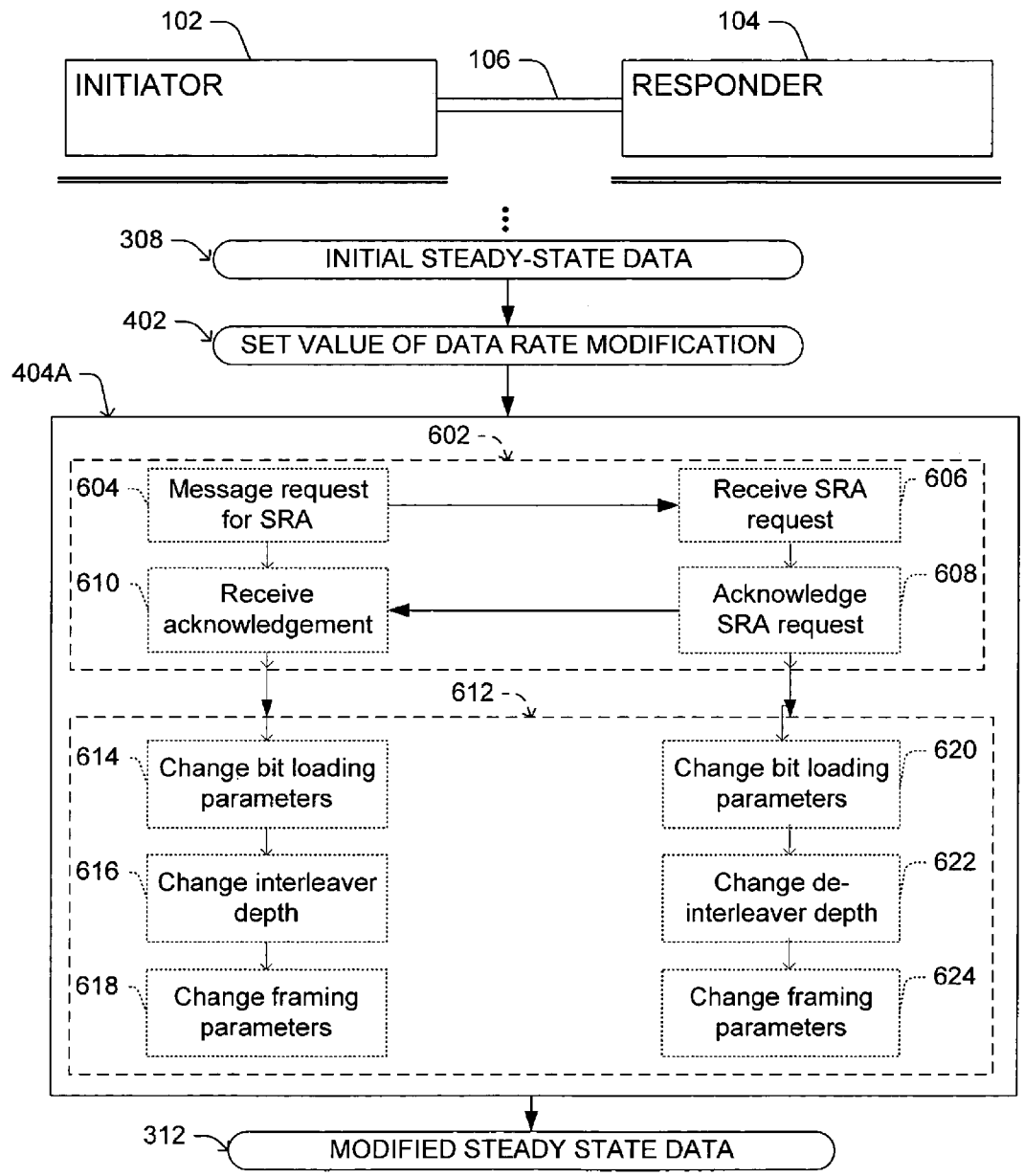
FIG. 6 is a chart relating to one embodiment of a SRA communication protocol.

After the modems have determined a value for the bit rate modification, the modems can undergo an SRA process to effectuate the desired bit rate change. FIG. 6 illustrates one embodiment of an SRA process 404A that can effectuate such a change in bit rate, wherein elements vertically aligned with the first and second modem 102 and 104 may be carried out in those respective modems, and wherein horizontal lines indicate communication signals or messages exchanged between the modems.

After the initiating modem (usually the receiving modem) has determined the value of the new data rate and the parameters associated therewith, it notifies the other modem which transmission variables are to be used in the modified steady state data transfer in step 602. At the close of the message exchange 602, both modems are prepared to synchronously implement the new transmission variables at 612 and proceed to modified steady state data transfer 312.

The message exchange 602 may include several sub-steps. For example, in sub-step 604 the initiating modem 102 transmits a message request for SRA (with associated new transmission variables) across the management channel to the other modem 104, which message request is received by the responding modem in sub-step 606. In one embodiment consistent with an SRA process specified in G.992.3, the transceiver of the initiating modem computes the new settings for relevant transmission variables (e.g., framing parameters, interleaving depths, and new bit and gain tables) and communicates them to the transceiver of the responding modem using an on-line reconfiguration Request Type 3 eoc command.

In sub-step 608, the responding modem 104 acknowledges the SRA request in an acknowledgement message, which acknowledgement message is received by the initiating modem in step 610. In one embodiment consistent with the SRA mechanism specified in G.992.3, the acknowledgement message may either: (a) reject the SRA request with a "Defer Type 3" or "Reject Type 3" response and corresponding reason code, or (b) accept the SRA request by transmitting a time marker via a Syncflag. The time marker indicates the DMT symbol at which both sides will perform SRA.

In step 612, after the completion of the message exchange, the modems 102 and 104, respectively, simultaneously implement the negotiated new transmission variables starting from the same symbol indicated by the time marker in the SRA acknowledgment. In implementing the new transmission variables, the modems may utilize several sub-steps (e.g., 614, 616, 618, 620, 622, 624), the order of which may depend on the relative priority of two or more communication parameters.

For example, in one embodiment of step 612, the modems may alter the bit loading parameters at 614, 620, then alter the interleaver depths 616, 622 and then modify the framing parameters at 618, 624. It will be appreciated, however, that this is only one embodiment, and that the order of steps 614-624 may be performed at different times relative to one another, depending on the relative priority of two communication parameters such as impulse noise protection and latency. The relative priority can be assigned by the initiating side or may be a default for the system, depending on whether it is more important to minimize variations in impulse noise protection or latency.

Figure 7:
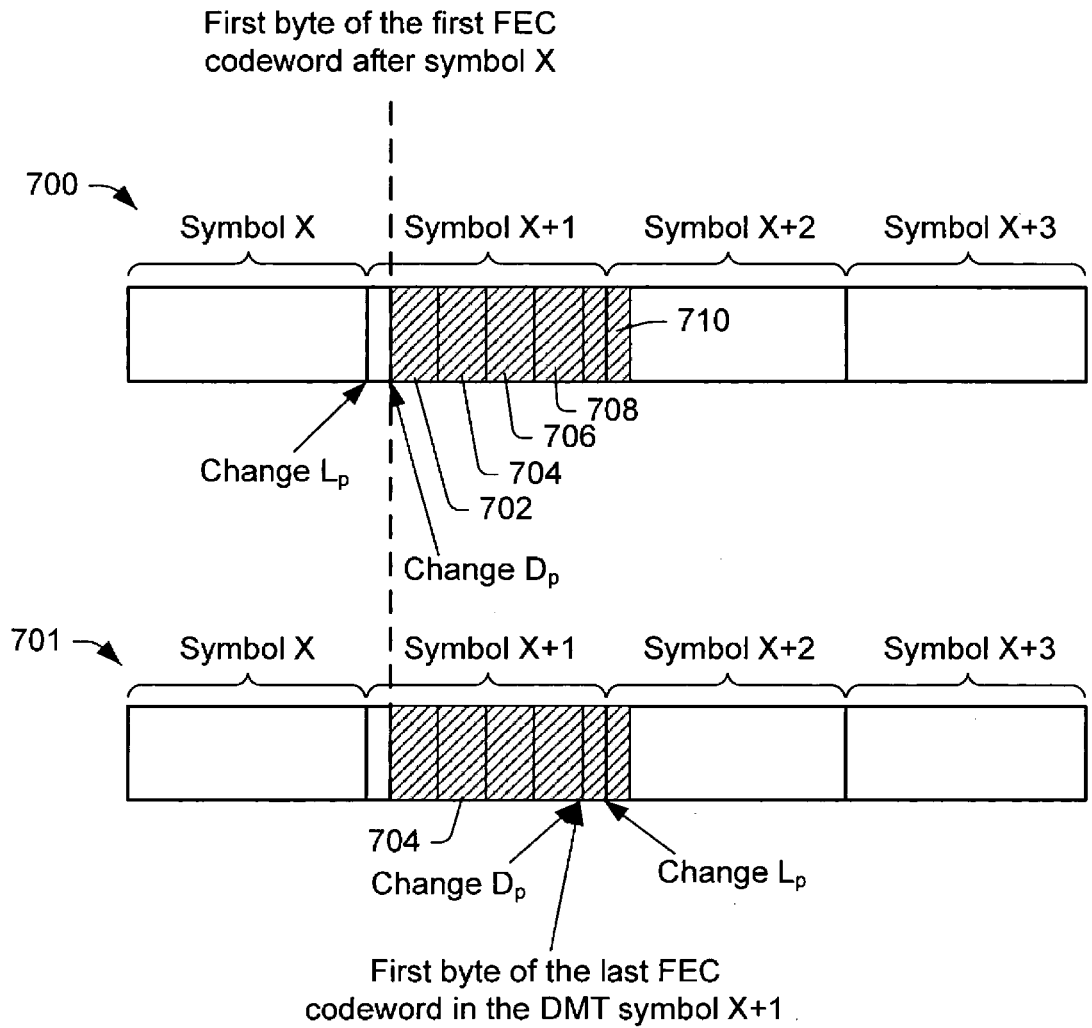
FIG. 7 is a chart relating to one embodiment of an SRA communication protocol.

This is shown in FIG. 7, which illustrates one embodiment in which data streams 700, 701 that each comprise four consecutive symbols (symbols X, X+1, X+2, X+3) and wherein an interleaver depth and, accordingly, delay are changed. In the illustrated embodiment, symbol X+1 includes four complete FEC codewords (702, 704, 706, 708) and a portion of another FEC codeword (710), wherein FEC codeword 710 is split between symbol X+1 and symbol X+2.

Thus, as the top portion of FIG. 7 evidences, bit loading parameter (Lp) can be altered before the interleaver depth (Dp) in several cases. For example, bit loading can be altered before the interleaver depth: if the SRA request concerns a decrease of the bit rate and if impulse noise protection has priority (e.g., variations should be minimized), or if the SRA concerns an increase of the bit rate and if latency has priority (e.g., variations should be minimized). In various embodiments relating to these two cases, the bit loading and interleaver depth can be changed in a common symbol. For example, Lp and Dp are changed at common symbol X+1 in the top portion of FIG. 7.

In the bottom portion of FIG. 7, bit loading can be altered after the interleaver depth. Such a scenario may arise if the SRA concerns a decrease in bit rate and if latency has priority (e.g., variations should be minimized), or if the SRA concerns an increase in bit rate and impulse noise protection has priority (e.g., variations should be minimized).

In various embodiments, it may be difficult to identify the last FEC codeword in the symbol because the boundaries of the FEC codewords may not be aligned with the boundaries of symbols. Thus, as one implementation, it is beneficial to start change of the interleaver depth at the j-th FEC codeword from the beginning of the symbol, where $1<=j<=J$, and J is the maximum number of FEC codewords transmitted in a symbol before the modified data rate is implemented.

Thus, as one of ordinary skill in the art will appreciate, the modems can be configured to change transmission variables such that they cooperatively implement a new data rate, wherein a bit loading parameters are selectively altered while communication parameters (e.g., related to impulse noise protection or delay) are held to comply system requirements, and in many cases are kept constant.

If SRA is necessary in two latency paths simultaneously, the procedure for each separate path is the largely the same as described above, albeit with the parameters as bit loading in a first path ($L_0$), interleaver delay in the first path ($D_0$) and bit loading in a second path ($L_1$), interleaver delay in the second path ($D_1$). In one implementation these two SRA processes are run independent of one another, and the time of each is referred to the SRA time marker. For instance, SRA in path #0 is performed at the first opportunity after the n-th DMT symbol of the time marker, and SRA in path #1 is performed at the first opportunity after the (n+k)-th DMT symbol of the time marker.

If the value of k is close to 1, the interleaver depth can be changed simultaneously in both latency paths. Specifically, the interleaving depth should be decreased in one latency path while it is increased in the other latency path. Despite that the sum of the interleaver memory (which can increase as the interleaving depth increases) is same both prior to SRA and after the SRA, additional memory is needed during the SRA because the decrease of memory in the first latency path at every instance of time is not necessarily equal to the increase of the memory in the second latency path. Thus, to avoid extra memory and complex memory management during the reconfiguration of interleavers in both paths, it is beneficial to change the interleaver depth sequentially: first in one latency path and then in the other one. This could be facilitated by selection of sufficiently high value of k.

In one embodiment, a pool of interleaver memory is flexibly shared between both latency paths. In other implementations, each latency path is granted with its own interleaver memory limit. In such embodiments, both interleavers could be re-configured simultaneously, in the range of interleaver memory granted to each latency path. No time delay is required, in other words the selected value of k may be small and even equal to 0. For this case SRA procedures in both latency paths can be "merged" so that $L_0$ and $L_1$ can be changed at the same DMT symbol. This will result in a one-step Lp (p=0 for latency path #0 and 1 for latency path #1) change instead of 2 independent steps in the previous case. The time for change of Dp for each latency path (p=0 for latency path #0 and 1 for latency path #1) should be linked to the DMT symbol where Lp is changed using the same mechanism based on INP versus delay priorities as above. For instance, if both $L_0$ and $L_1$ are increased and INP has higher priority than delay, values of Dp for both paths should be changed at the last opportunity in the previous DMT symbol, as shown in FIG. 7. If delay has a priority versus INP, the values of Dp in both latency paths should be modified at the first opportunity inside the DMT symbol assigned for the change of Lp.

DRR can be performed for a system which includes at least two latency paths, and wherein each path may have its own FEC encoder/decoder and interleaver/de-interleaver. In general, there may be p latency paths, where p is any integer number greater than or equal to 2. For example, in some DMT systems, two latency paths (channels) are supported: interleave data and fast data (without interleaving). For typical implementations, a predetermined number of bits $L_p$ is assigned for each path p. The total number of bits L loaded onto each DMT symbol is $L=L_0+L_1$, where $L_0$ is the number of bits loaded onto each DMT symbol for the first path and $L_1$ is the number of bits loaded onto each DMT symbol for the second path. By definition, the value of L does not change during DRR and the total bit rate is shared among the two latency paths in different ways. Thus, the values of $L_0$ and $L_1$ can change as requested by the modem initiating DRR, but the total bit rate in across all latency paths will remain constant.

DRR is usually initiated by the provider's modes, and thus is often initiated by the transmitter. Because the total bit rate at both paths is fixed (L is constant), the interleaver depth may be unable to be set in both latency paths so as to satisfy the required bit rate setting and keep constant impulse noise protection and/or delay. Therefore, a priority scheme could be used in one of the paths to determine advantageous delay and impulse noise protection settings, while the second path will adjust its impulse noise protection/delay accordingly. For the current description, assume that the path $L_0$ is subject to change and that path $L_1$ has priority for delay and impulse noise protection settings.

In one DRR embodiment, each modem 102 and 104 has an interleaver with an interleaver depth that is changed simultaneously in both latency paths (e.g., the interleaving depth can be decreased in one path and increased in the other.) Despite that the depth of the interleaver memory is constant both prior to DRR and after DRR, additional memory is needed during DRR because the memory decrease in the first latency path at every instance of time is not necessarily equal to the memory increase in the second latency path. To avoid complex memory management during the reconfiguration of the interleavers in both paths, it is beneficial to change the interleaver depth sequentially: first in one latency path and then in the other one. This will cause a temporary reduction of impulse noise protection in the latency path where bit rate is increased or a temporary increase of latency in the latency path which bit rate is decreased. Depending on the priority, the interleaver of the first or of the second latency path can be changed first, while the other interleaver is changed after some time delay.

In one typical DRR embodiment, each modem 102 and 104 includes a pool of interleaver memory that is dynamically shared between both latency paths. In other implementations, each latency path has its own interleaver memory. If so, both interleavers could be re-configured simultaneously, in the range of interleaver memory granted to each latency path and no time delay is required.

Figure 8:
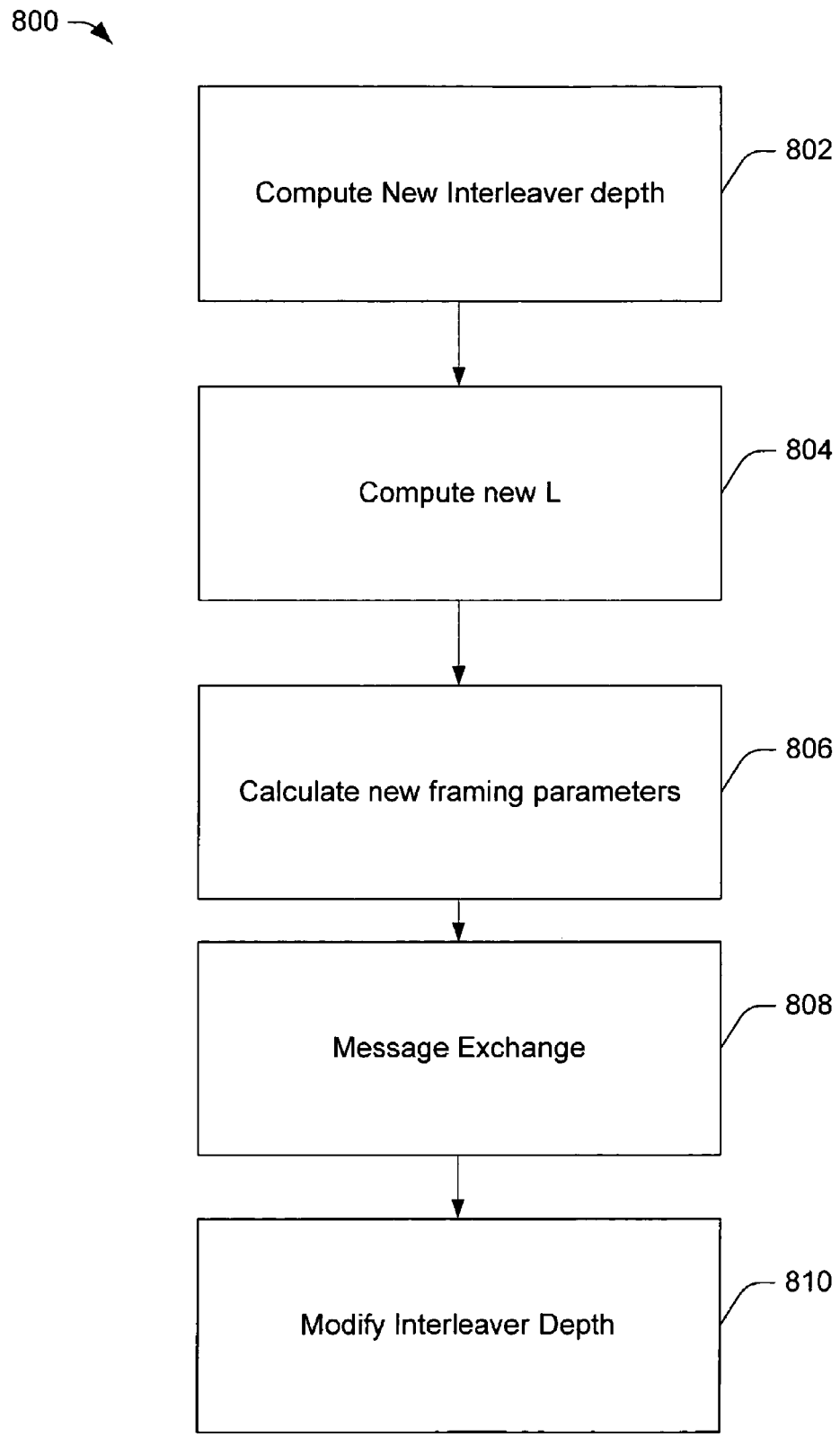
FIG. 8 is a flowchart of one embodiment of a DRR communication protocol.

FIG. 8 illustrates one embodiment in which a DRR process 800 is used to effectuate a change from the initial steady state data transfer 308 to a modified steady state data transfer 312 (e.g., as shown in FIG. 3). The following variable will be used in the description below: $D_0$, $L_0$, $D_1$, $L_1$ are initial values of interleaving depth and bit loading parameters of latency paths #0 and #1 (before DRR), while $D'_0$, $L'_0$, $D'_1$, $L'_1$ are the new values of interleaving depth and bit loading parameters of latency paths #0 and #1 (after DRR).

In step 802, the initiating modem, based on a request for the new value of $L_0'$, computes the required new value of the interleaver depth for latency path #1, namely $D_1$. Further, the initiating modem finds the next valid value of $D_1$ bigger than or equal to $D_1'$, and computes the new value of $L_1$ corresponding to the found value of $D_1$, for example, by using equation (1) or (2) above (e.g., depending on whether constant impulse noise protection or constant delay is a priority for the system).

In step 804, from the computed value of $L_1$, the modem computes $L_0=L-L_1$. For the obtained value of $L_0$, the modem computes the value of $D_0'$, for example by using the inversed equation (1) or (2) (e.g., depending on whether unchanged impulse noise protection or unchanged delay is on priority for the specific system). Further, the modem selects the value of $D_1$ which is equal to $D_1'$, if $D_1'$ is among the valid values of the interleaving depth, or the next to $D_1'$ smaller valid value of the interleaving depth if not exceeding of delay restrictions is the priority, or the next to $D_1'$ higher valid value of the interleaving depth if maintaining impulse noise protection is the priority of the specific service/system.

In step 806, based on the selected value of $L_0$, $L_1$, the modem derives one or more new values of framing parameters to accommodate overhead bit rate and other management-related contents to the new bit rate setting for both latency paths.

In step 808, the initiating modem and responding modem exchange message-requests for DRR over a management channel to negotiate the set of transmission variables to be used in the modified steady state data transfer. This message exchange step may be the same as the message exchange step 602 previously discussed with reference to FIG. 6.

In step 810, the modems modify the depths of the interleavers. In one embodiment the interleaver memories for both latency paths are separated and independent. Both sides modify the values of interleaving depth in both latency paths (either $D_0$, or $D_1$, or both) relatively to the marked DMT symbol agreed upon in the message exchange (808). In each path interleaving depth is modified at the first available place after the start of the marked DMT symbol. The actual place of modification of interleaving depth in one or both latency paths may be also beyond the marked DMT symbol. Further, the values of L for both paths are modified from the beginning of the same DMT symbol, which depends on the service priority indicator for latency paths. Specifically, if the path #1 has a priority over path #0 for delay or impulse noise protection settings, the change of L can be referred to this path. If the DRR concerns a decrease in bit rate in path #1, the value of L may be changed at the same DMT symbol as $D_1$ is set or at the next DMT symbol, if temporary increase in latency is unacceptable for the service in path #1. If the DRR concerns an increase of the bit rate in path #1, L can be changed at the same DMT symbol as $D_1$, if temporary increase of latency is unacceptable for the service in path #1, or L can be changed in the next DMT symbol if temporary change in impulse noise protection is unacceptable for the service in path #1. In case latency path #0 has priority in latency or impulse noise protection relatively to latency path #1, the rule for setting of L is the same except it is referred to the DMT symbol when Do is set. (switched order of path #0 and path #1). If both paths have same priorities, the DMT symbol when values of $L_0$ and $L_1$ are changed may refer as described to any of the latency paths, or be performed at some DMT symbol between the DMT symbols where $D_0$ and $D_1$ are changed. In the most of practical cases, however, there are available place for modification for both latency paths in the same DMT symbol. For VDSL2, for instance, this takes place if more than one FEC codeword is transmitted during a DMT symbol, which is the usual case.

The change in the $D_p$ is started from the specific byte of the FEC codeword which may depend on the used interleaver changing algorithm. If there are several bits transmitted in the DMT symbol where change to be occur, the first possible location can be used.

In other embodiments, the interleavers use the same memory pool, and a priority indication sent by the CO (central office) or a default set whether temporary loss of impulse noise protection or temporary delay variation is preferable. In the case temporary increase of delay is preferable the value of D can be first modified in the path where the value of L is reduced. Further, the value of D in the second latency path can be modified after a delay on G DMT symbols from the DMT symbol which marks the change in the first latency path. The value of G can be either communicated during the message request for the DRR or set as a default. The value of G can be selected so that sufficient amount of memory is released to modify (increase) the interleaving depth in the second path.

Figure 9:
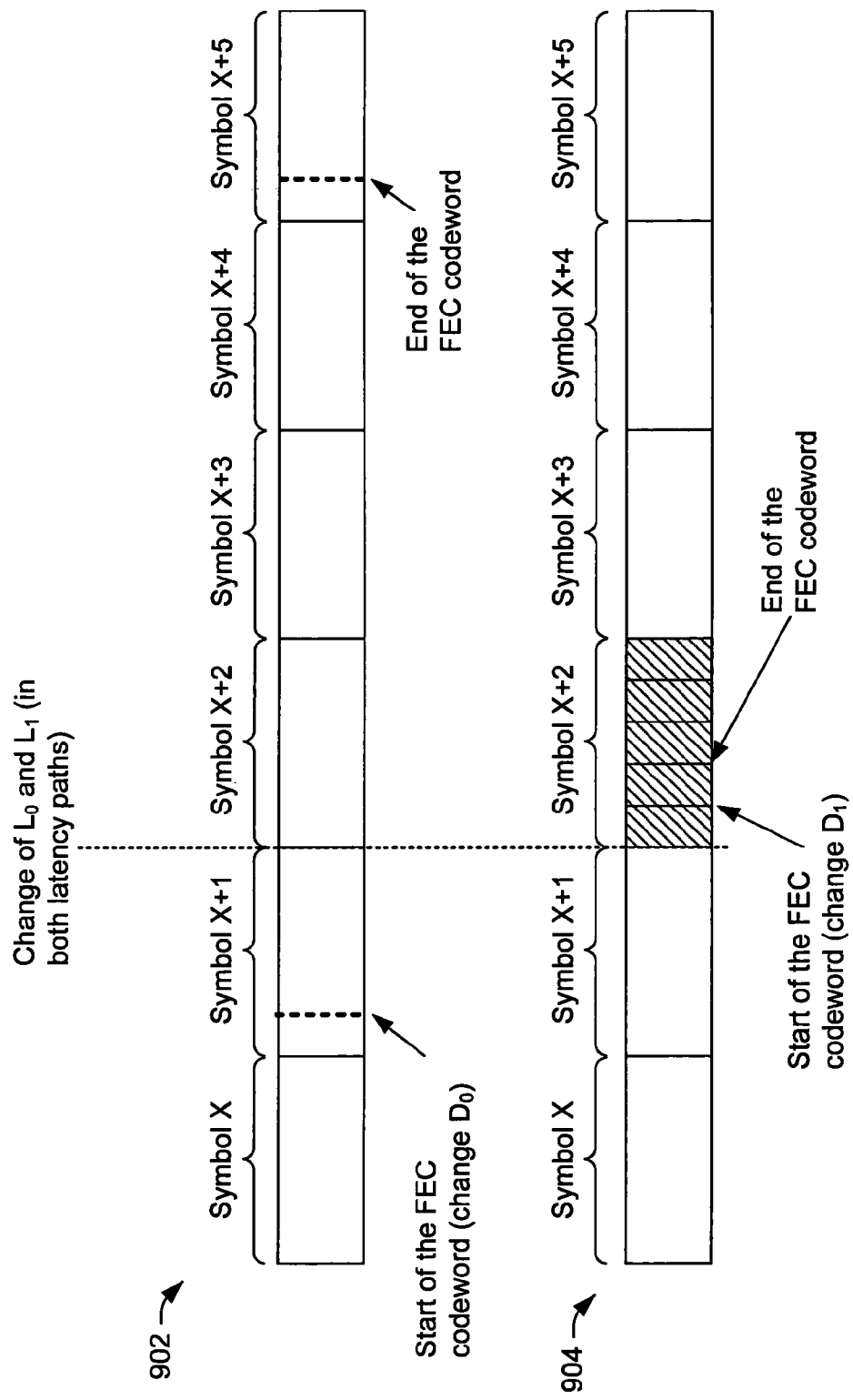
FIG. 9 is a chart relating to one embodiment of a DRR communication protocol.

In one embodiment, the bit rates over two latency paths are very different, and thus the number of FEC codewords transmitted during one DMT symbol is different as well. For instance, if the difference in bit rate is 20 times, one latency path can have 5 FEC codewords per DMT symbol, while the other one can have only one FEC codeword per 4 DMT symbols (assuming that FEC codeword size is the same in both paths). One such case is illustrated in FIG. 9 for the case when variation of the impulse noise protection is to be minimized (e.g., impulse noise protection has priority over the delay), wherein the first latency path carries data stream 902, which has 5 FEC codewords per symbol, and wherein the second latency path carries data stream 904, which has 1 FEC codeword per 4 symbols. If there is more than one codeword per symbol, the modems may change the interleaving depth at the same DMT symbol, the previous DMT symbol, or next DMT symbol as shown in FIG. 9. In our example, if we select as a reference to change $D_0$ the suitable DMT symbol in latency path #0 with one FEC codeword per 4 symbols, the same DMT symbol will be suitable to change $D_1$ in the second latency path (with 5 FEC codewords per DMT symbol). The same symbol, the next one, or the previous one, will be to change the Lp in both paths, depending on the selected priority whether the impulse noise protection variation or the delay variation can be minimized during the transient.

One way of implementing the rules associated with the case described in FIG. 9 is to find first the first opportunity to change Dp for the latency path with lower bit rate. If this bit rate is to be increased by DRR and impulse noise protection has a priority versus delay, the $L_0$, $L_1$ can be modified at the beginning of the DMT symbol which is next to the one when first opportunity to change interleaving depth in latency path was found. The interleaving depth of the other latency path can be accordingly reduced, and keeping the same rule for priorities this can be done at the first opportunity in the same DMT symbol where $L_0$, $L_1$ are changed.

In the case when both latency paths use the same memory pool, there can be a priority indication sent by the CO (central office) or a default set whether temporary loss of impulse noise protection or temporary delay variation is preferable. In the case temporary increase of delay is preferable the value of interleaving depth can be first modified in the path where the value of L is reduced. Further, the value of interleaving depth in the second latency path can be modified after a delay on G DMT symbols from the DMT symbol which marks the change in the first latency path. The value of G can be either communicated during the message request for the DRR (see item 4) or set as a default. The value of G can be selected so that sufficient amount of memory is released to modify (increase) the interleaving depth in the second path.

In the case temporary loss of impulse noise protection is preferable rather than delay variation, the value of interleaving depth can be first modified in the path where the value of L is increased. Further, the value of interleaving depth in the other latency path can be modified after a delay on G DMT symbols from the DMT symbol which marks the instant of the DRR.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for transitioning from an initial data rate to a new data rate in a multi-carrier communication system, comprising:
   determining whether a first communication parameter has priority over a second communication parameter or whether the second communication parameter has priority over the first communication parameter;
   using an initial bit loading parameter Lp and an initial interleaver depth Dp to transmit a series of symbols at the initial data rate from a transmitter to a receiver;
   determining that the new data rate is desired between the transmitter and receiver;
   if the first communication parameter has priority over the second communication parameter, then calculating a modified bit loading parameter Lp' according to a first function;
   if the second communication parameter has priority over the first communication parameter, then calculating the modified bit loading parameter Lp' according to a second function that differs from the first function; and
   using the modified bit loading parameter to transmit data from the transmitter to the receiver at the new data rate;
   wherein the modified bit loading parameter Lp' is calculated based on the initial bit loading parameter Lp.

2. The method of claim 1, wherein using the modified bit loading parameter to transmit data from the transmitter to the receiver at the new data rate comprises:
   transmitting a time marker from the transmitter to the receiver;
   concurrently changing from the initial bit loading parameter to the modified bit loading parameter at the time marker in both the transmitter and receiver.

3. The method of claim 2, wherein the time marker corresponds to a symbol boundary between first and second symbols.

4. The method of claim 3, wherein the first and second symbols include a series of bytes that correspond to at least one forward error correction codeword made up of a number of codeword bytes.

5. The method of claim 4, further comprising changing from the initial interleaver depth Dp to a modified interleaver depth Dp' at a codeword byte that is offset from the symbol boundary.

6. A method for transitioning from an initial data rate to a new data rate in a multi-carrier communication system, comprising:
   determining whether a first communication parameter has priority over a second communication parameter or whether the second communication parameter has priority over the first communication parameter;
   using an initial bit loading parameter Lp and an initial interleaver depth Dp to transmit a series of symbols at the initial data rate from a transmitter to a receiver;
   determining that the new data rate is desired between the transmitter and receiver;
   if the first communication parameter has priority over the second communication parameter, then calculating a modified bit loading parameter Lp' according to a first function;
   if the second communication parameter has priority over the first communication parameter, then calculating the modified bit loading parameter Lp' according to a second function that differs from the first function; and
   using the modified bit loading parameter to transmit data from the transmitter to the receiver at the new data rate;
   where the first function is represented by the following relationship:

$$Lp' = \text{floor}\left(Lp \times \frac{Dp'-1}{Dp-1}\right)$$

wherein Dp' is a modified interleaver depth.

7. A method for transitioning from an initial data rate to a new data rate in a multi-carrier communication system, comprising:
   determining whether a first communication parameter has priority over a second communication parameter or whether the second communication parameter has priority over the first communication parameter;
   using an initial bit loading parameter Lp and an initial interleaver depth Dp to transmit a series of symbols at the initial data rate from a transmitter to a receiver;
   determining that the new data rate is desired between the transmitter and receiver;
   if the first communication parameter has priority over the second communication parameter, then calculating a modified bit loading parameter Lp' according to a first function;
   if the second communication parameter has priority over the first communication parameter, then calculating the modified bit loading parameter Lp' according to a second function that differs from the first function; and
   using the modified bit loading parameter to transmit data from the transmitter to the receiver at the new data rate;
   where the second function is represented by the following relationship:

$$Lp' = \text{floor}\left(Lp \times \frac{Dp'}{Dp}\right)$$

wherein Dp' is a modified interleaver depth.

* * * * *